Feb. 1, 1927.
C. HLAVACEK
SPRING STABILIZER
Filed March 3, 1926
1,615,874
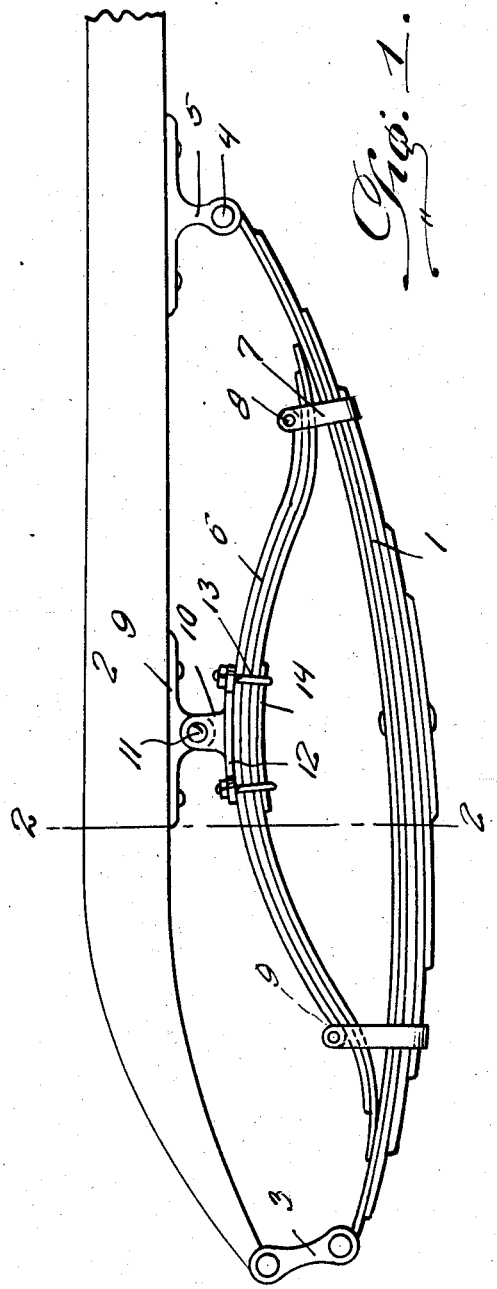
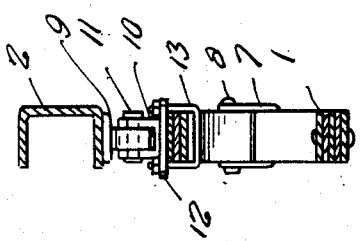
Inventor
C. Hlavacek,
By Clarence A O'Brien
Attorney Patented Feb. 1, 1927.

1,615,874

UNITED STATES PATENT OFFICE.

CHARLES HLAVACEK, OF BROOKLYN, NEW YORK.

SPRING STABILIZER.

Application filed March 3, 1926. Serial No. 91,977.

My present invention has to do with stabilizing of the springs of automobiles and the like; and it contemplates the provision of a peculiar and advantageous spring stabilizer as hereinafter described and definitely claimed.

In the accompanying drawings, forming part of this specification:—

Figure 1 is an elevation illustrating a stabilizer constituting the preferred embodiment of my invention as properly arranged relative to a rear spring of an automobile.

Figure 2 is a transverse section taken in the plane indicated by the line 2—2 of Figure 1.

Similar numerals of reference designate corresponding parts in both views of the drawings.

The rear spring alluded to is designated by 1 and its outer end is suspended from one end of a chassis bar 2 through the medium of a swingable link 3, and its other end is pivoted at 4 to a hanger 5 disposed under and carried by the chassis bar 2.

The connections described as complementary to the spring 1 are not of my invention, and in said connections it will be understood that the end of the spring 1 may be joined to the chassis bar 2 in any manner consonant with the purpose of my invention without affecting the latter.

My novel spring stabilizer designated by 6 may be formed of any desired number of spring leaves, according to the purpose to which the automobile embodying my improvement is to be put. The said stabilizer 6 is superposed upon the spring 1 and bears against said spring 1 at intermediate points in the length of the latter, and it will be noted that bail-shaped hangers 7 straddle and receive portions of the spring 1 and are pivotally connected to the stabilizer 6 through the medium of pintles 8 that extend through eyes 9 at the ends of the upper leaf of the stabilizer 6.

An appropriate flexible coupling is interposed between the chassis bar 2 and the middle portion of the stabilizer 6. The said coupling comprises a member 9 arranged under and fixed to the chassis bar 2, a member 10 pivotally connected at 11 to the member 9 and having extended base portions 12, and shackles 13 receiving the stabilizer 6 and connecting the same to the coupling member 10. It will also be noted that the shackles 13 receive a wear plate 14 which is interposed between the bights of the shackles and the lowermost leaf of the stabilizer 6, this in order to contribute to the general strength and durability of the stabilizer.

Manifestly by virtue of the manner in which the stabilizer 6 and the spring 1 are joined, the stabilizer and the spring are each capable of limited endwise movement relative to the other.

My novel stabilizer being positioned between the chassis bar or frame and the spring 1 and over the top of the main leaf of the spring 1, it follows that the stabilizer will improve the riding quality of the car, in that said stabilizer eliminates rear end vibration, frequently noticed when a car passes over an irregularity in the road, and it also contributes materially to the preventing of side skidding, this being due to the fact that starting of a skid is prevented because of the steady pressure maintained upon the rear wheels by my improvement which assures continuous contact of the wheels with the road surface. Again my novel stabilizer is calculated to promote adhesion of the wheels to the road and in that way lessen the wear of tires. My novel stabilizer is further advantageous inasmuch as it is possessed of transverse and torsional stiffness, and therefore when the leaves in the stabilizer 6 are properly fitted, the said leaves in sliding over each other bring about a certain amount of friction calculated to prevent unduly free movement.

The friction of the leaves alluded to as well as the stressing of the leaves is susceptible of being definitely controlled, and is not liable to vary during the period of use of the stabilizer. It will also be appreciated that in addition to being sufficiently flexible to absorb shock, my novel stabilizer possesses inherent damping qualities calculated to retard rebounds.

The bails 7 are specially advantageous in that they are calculated to prevent breakage of the leaves when an automobile passes over a depression in a surface or road and the combined weight of the rear housing and the wheels tends to relax the leaves in the spring. Said bails 7 also tend to assist in checking rebounds.

Manifestly it is within the purview of my invention to include as many leaves in the stabilizer 6 as is deemed expedient by the manufacturer.

Notwithstanding the practical advantages ascribed to my improvement, it will be noted that the improvement is simple, inexpensive and compact in construction, and hence is not liable to render a car cumbersome or unsightly in appearance.

While I have specifically described the preferred embodiment of my invention in order to impart an exact understanding of said embodiment in all of its details, I do not desire, to be understood as limiting myself to the structure disclosed, my invention being defined by my appended claims within the scope of which modifications in structure and arrangement may be made without departure from my invention.

Having described my invention, what I claim and desire to secure by Letters Patent, is:—

1. In combination, a chassis, a spring disposed below the chassis and connected at its ends therewith, a stabilizer superposed upon the spring and bowed reversely thereto and bearing at its ends against the spring and formed of a plurality of superposed leaves, the uppermost leaf having eyes at its ends, bails straddling the spring and the end portions of the stabilizer, pintles connecting the bails to said eyes, a coupling member disposed below and fixed to the chassis, a coupling member pivotally connected to and pendent from the first-named coupling member and having a base superposed upon the intermediate portion of the stabilizer, a plate arranged under the intermediate portion of the stabilizer, and shackles straddling the said plate and the stabilizer and connected to the base of the second-named coupling member.

2. In combination, a chassis, a spring disposed under the chassis and having its ends connected therewith, a stabilizer bowed reversely to and superposed upon the spring, pendent bails carried by the end portions of the stabilizer to hold the same to the spring and against upward movement from the spring, and means pivotally connecting the intermediate portion of the stabilizer to the chassis; the said means comprising a member disposed below and fixed to the chassis, and a member pivotally connected to the first-named member and superposed upon and connected with the stabilizer, and the said members and pivot connection arranged to permit endwise swinging movement of the stabilizer.

3. In combination, a chassis, a spring disposed below the chassis and having its ends connected therewith, a stabilizer bowed reversely to and superposed upon the spring, means holding the end portions of the stabilizer against upward movement from the spring, and a connection swingable longitudinally of the spring and stabilizer and interposed between an intermediate portion of the stabilizer and the chassis.

In testimony whereof I affix my signature.

CHARLES HLAVACEK.